May 20, 1952 R. J. WILLIAMS 2,597,271
COOKY MAKING MACHINE
Filed Oct. 9, 1946 9 Sheets-Sheet 1

INVENTOR.
Richard J. Williams
BY
Harness, Dickey & Pierce.
ATTORNEYS.

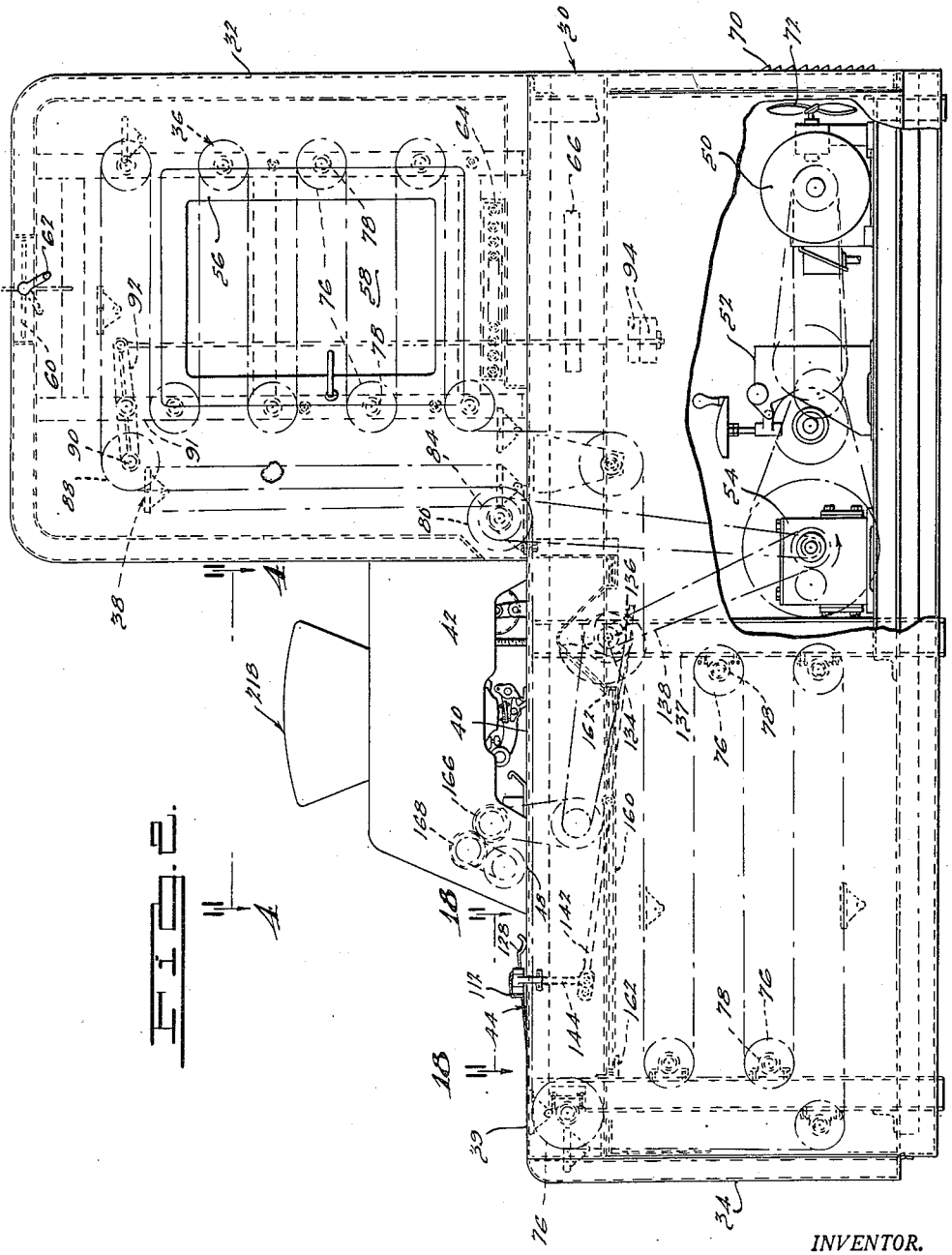

May 20, 1952 R. J. WILLIAMS 2,597,271
COOKY MAKING MACHINE
Filed Oct. 9, 1946 9 Sheets-Sheet 3
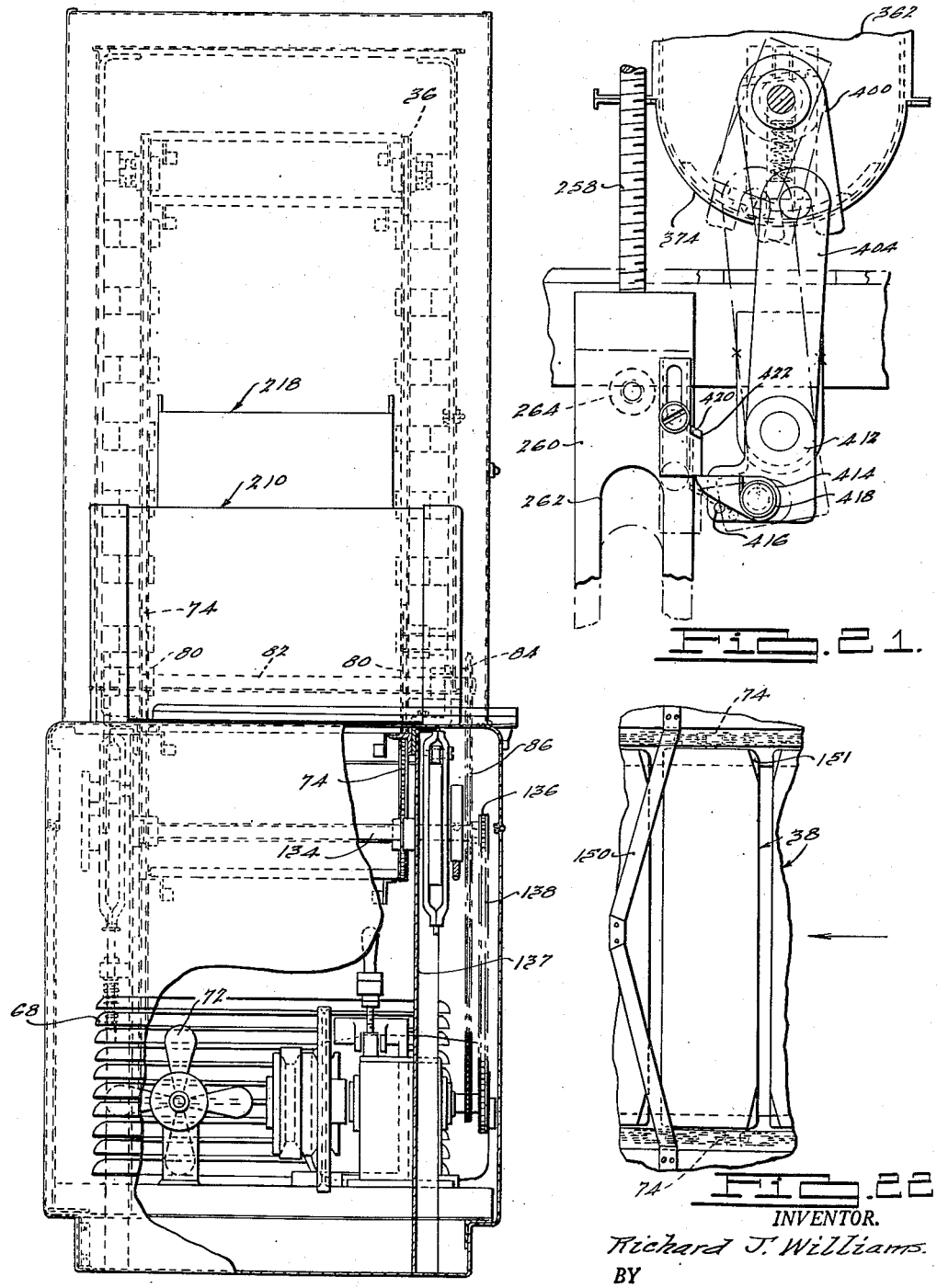
INVENTOR.
Richard J. Williams.
BY
Harness, Dickey & Pierce
ATTORNEYS.

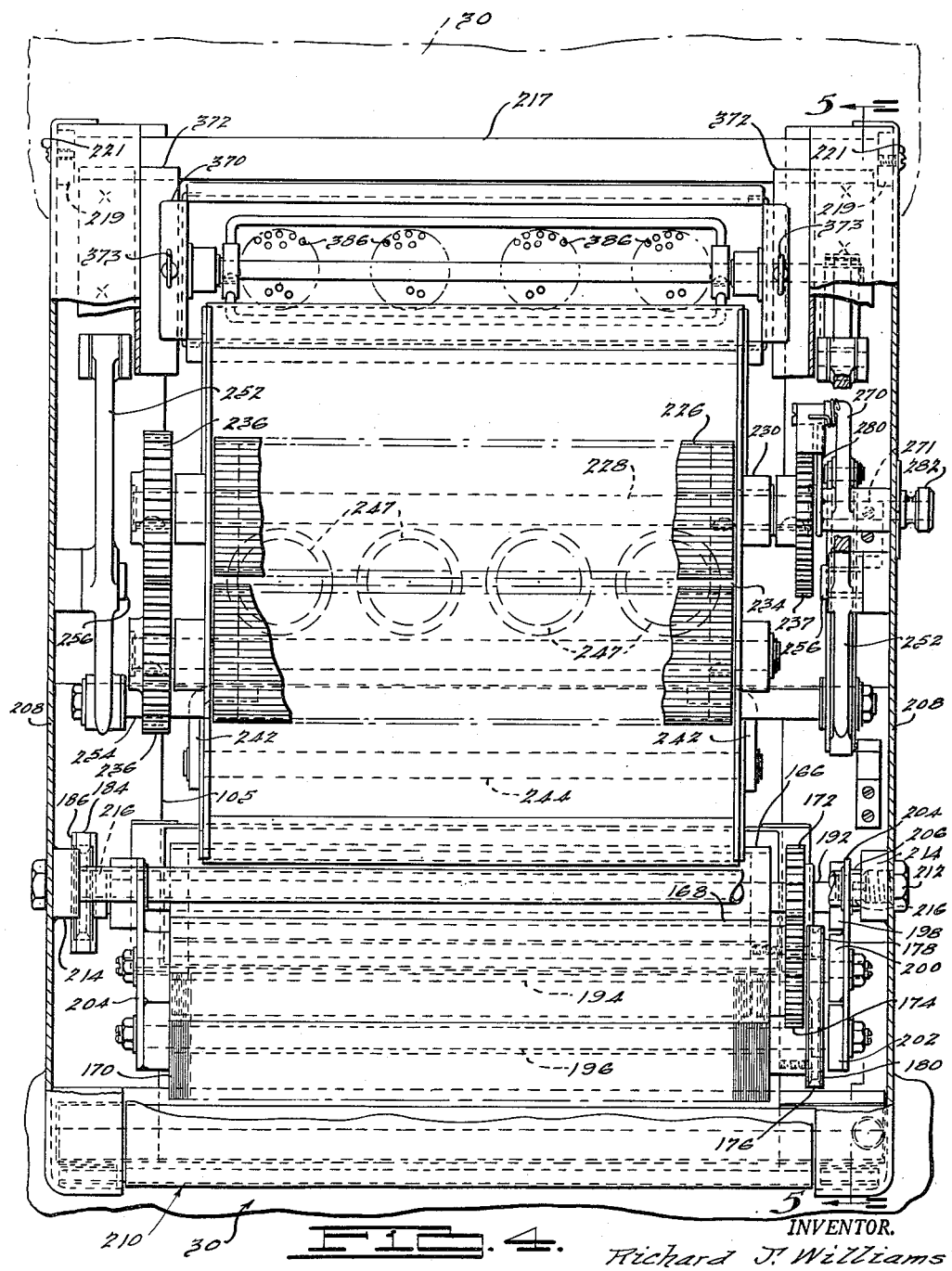

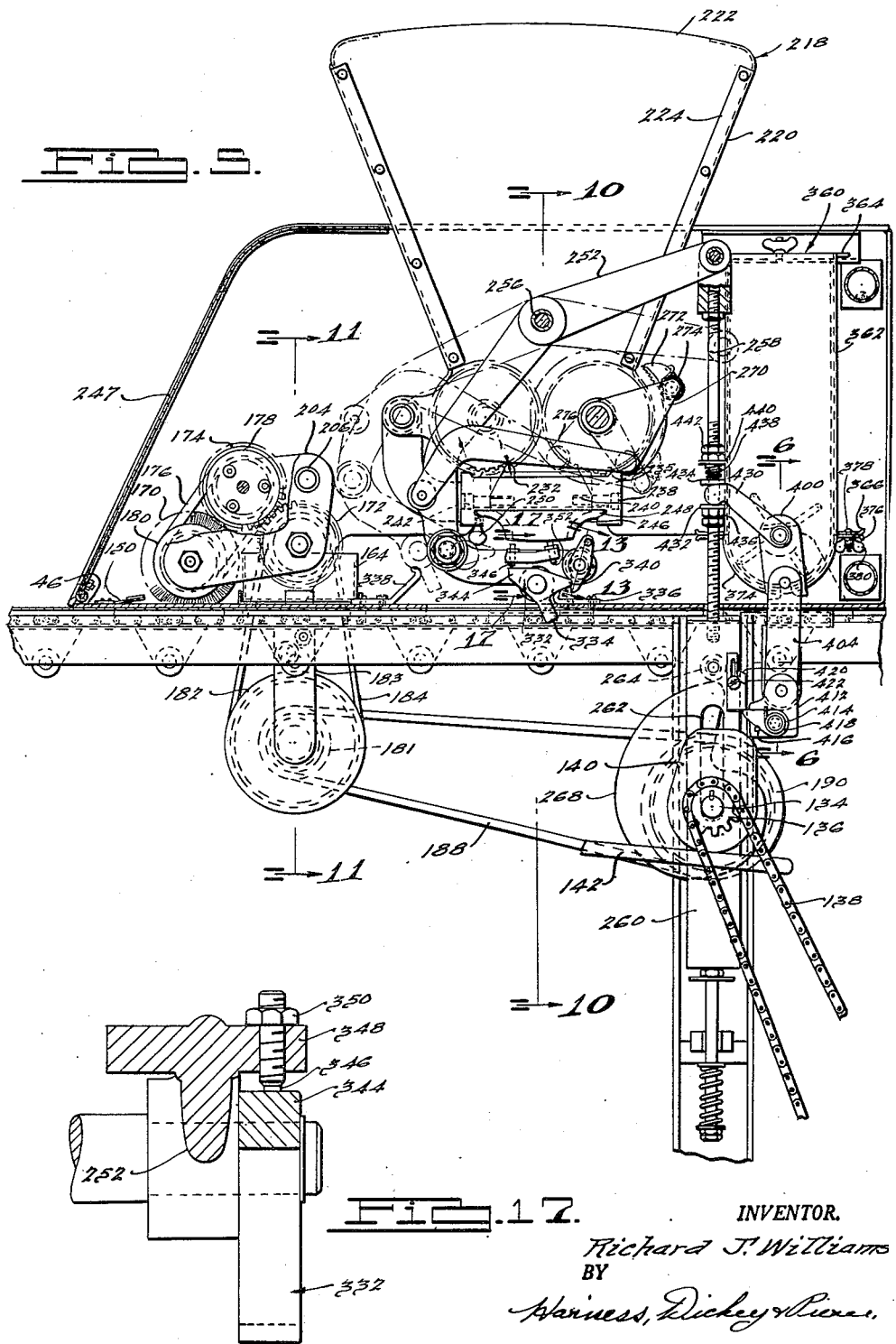

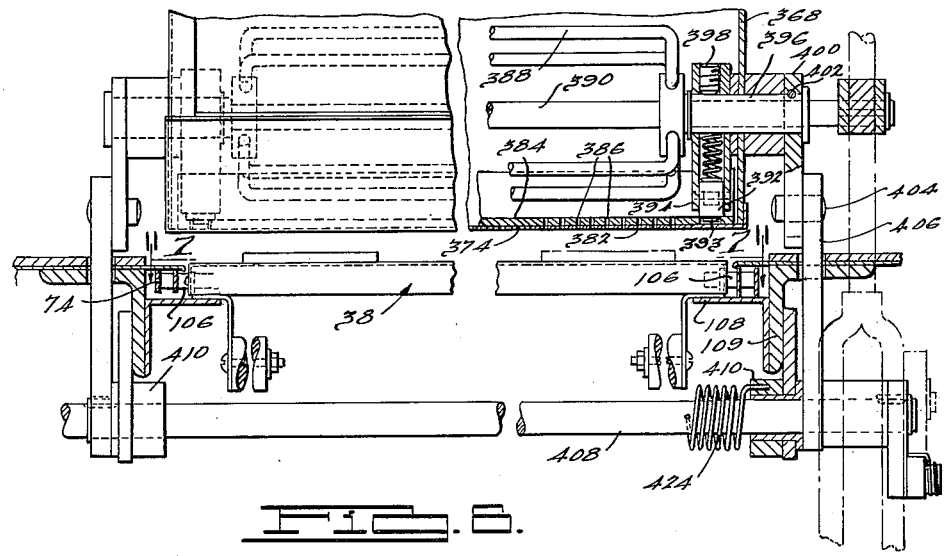
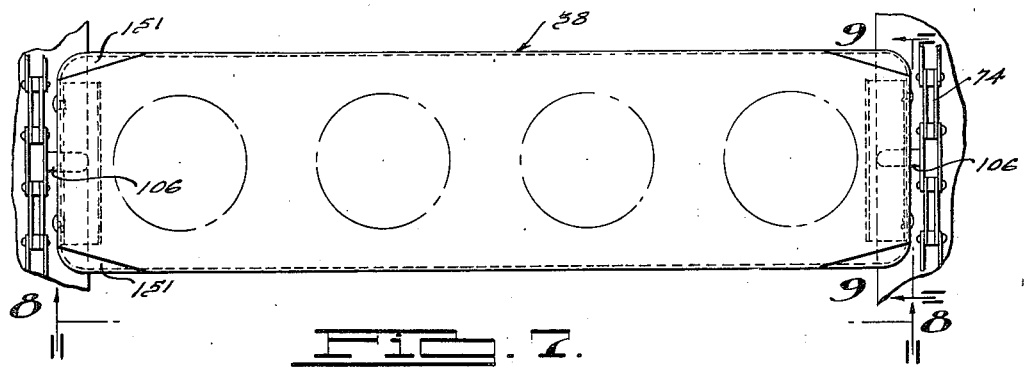
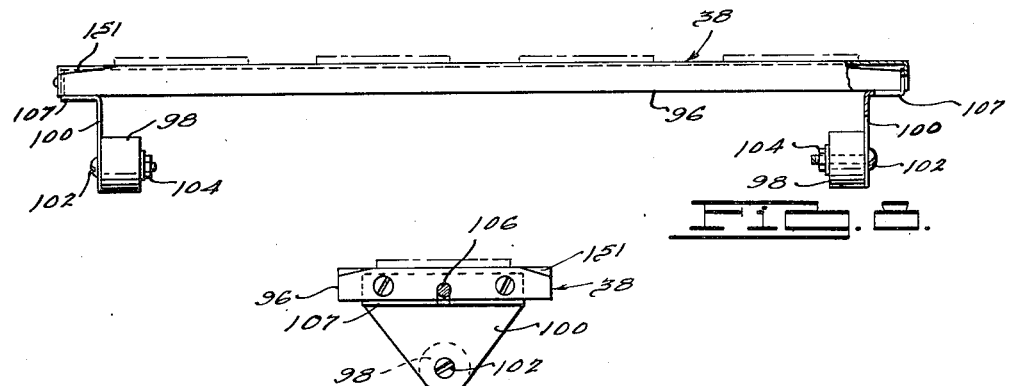
INVENTOR.
Richard J. Williams.
BY
Harness, Dickey & Pierce.
ATTORNEYS.

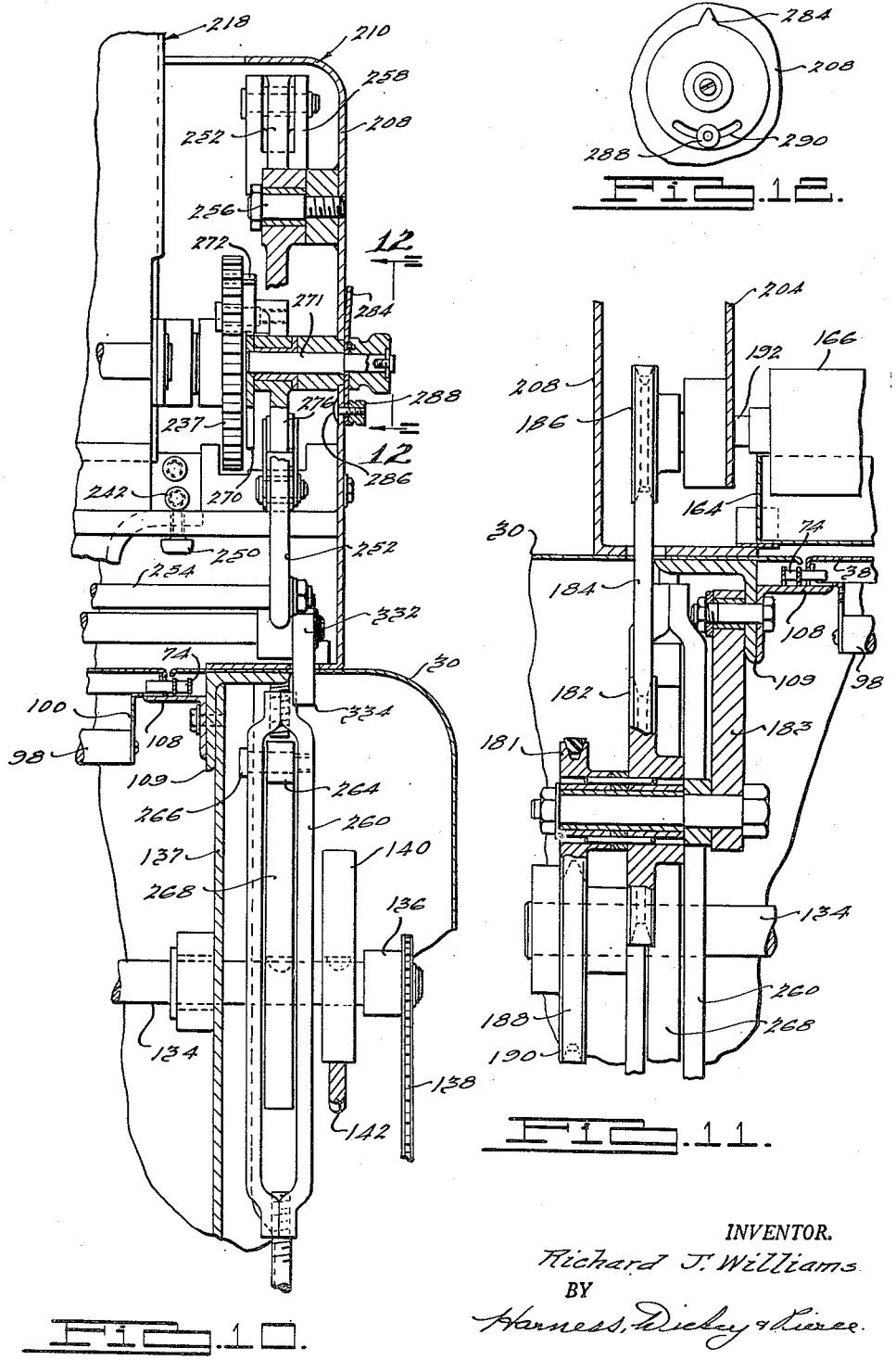

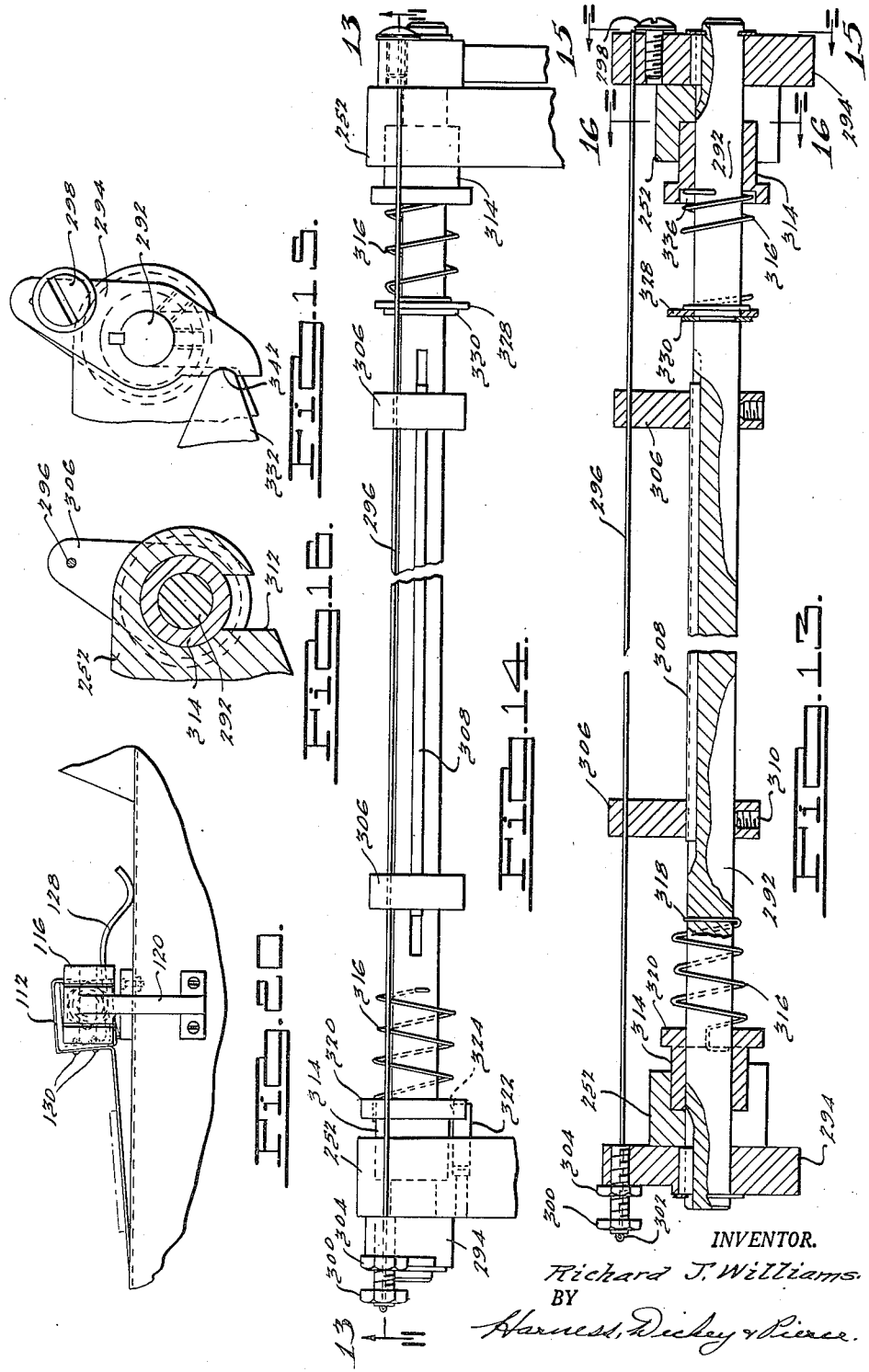

INVENTOR.
Richard J. Williams
BY
Harness, Dickey & Pierce
ATTORNEYS.

Patented May 20, 1952

2,597,271

UNITED STATES PATENT OFFICE 2,597,271

COOKY MAKING MACHINE

Richard J. Williams, Birmingham, Mich.

Application October 9, 1946, Serial No. 702,222

5 Claims. (Cl. 107—7)

This invention relates to baking equipment and more particularly to an automatic machine for operating on batter, dough or the like and producing finished baked goods.

The principal objects of the invention are: to provide an improved automatic machine adapted to receive a prepared batter or dough and perform all the operations necessary to turn out completed baked goods; to provide a machine incorporating improved means for forming the dough or batter into rolls, cookies or the like, having improved means for baking and drying the product and for removing the finished product from the machine; to provide, in such a machine, improved means for applying a suitable topping to the cookies; to provide an improved conveyer adapted for use in a baking machine and including improved trays carried thereby for supporting the cookies in a horizontal position independently of the direction of movement of the conveyer; to provide in a baking machine means for driving the conveyer and operating the cookie-forming means, the topping dispensing means and the cookie removing means; to provide driving means for a baking machine by which the cookie forming, topping dispensing and cookie removing operations are performed in timed relation to the movement of a conveyer; to provide a baking machine having a table top portion along which a plurality of stations are located, at which are performed sequential operations incident to the making of the final baked goods which are advanced on trays having supporting surfaces disposed flush with said table top portion; and to provide improved means disposed intermediate said cookie removing and said cookie forming means for cleaning and greasing the cookie-carrying trays.

With the above as well as other and more detailed objects in view, which will become apparent from a consideration of the following specification and appended claims, a preferred embodiment of the invention is illustrated in the accompanying drawings, throughout the several views of which like reference characters designate like parts, and wherein:

Fig. 2 is a front elevational view of the machine illustrated in Fig. 1;

Fig. 3 is an end view of the machine illustrated in Fig. 1, showing a portion of the cabinet broken away;

Fig. 4 is an enlarged broken plan view of the structure illustrated in Fig. 2, as viewed from the line 4—4 thereof, and showing parts broken away;

Fig. 5 is a sectional view of the structure illustrated in Fig. 4, taken substantially along the line 5—5 thereof;

Fig. 6 is a broken sectional view of the structure illustrated in Fig. 5, taken substantially along the line 6—6 thereof;

Fig. 7 is a plan view of a portion of the structure illustrated in Fig. 6, as viewed from line 7—7 thereof;

Fig. 8 is an elevational view of the structure illustrated in Fig. 7 as viewed from line 8—8 thereof;

Fig. 9 is a sectional view of the structure illustrated in Fig. 7, taken substantially along the line 9—9 thereof;

Figure 19:
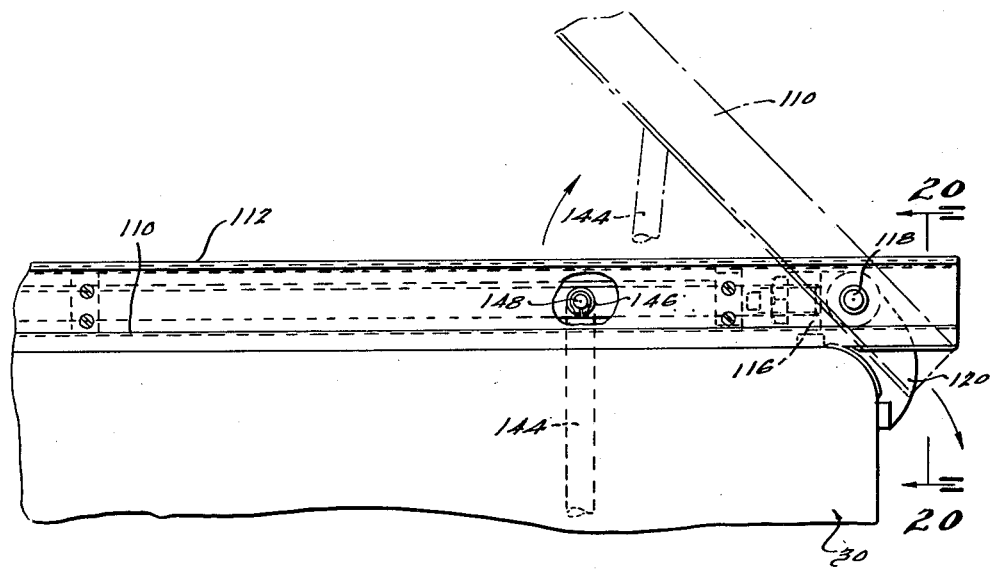
Figure 18:
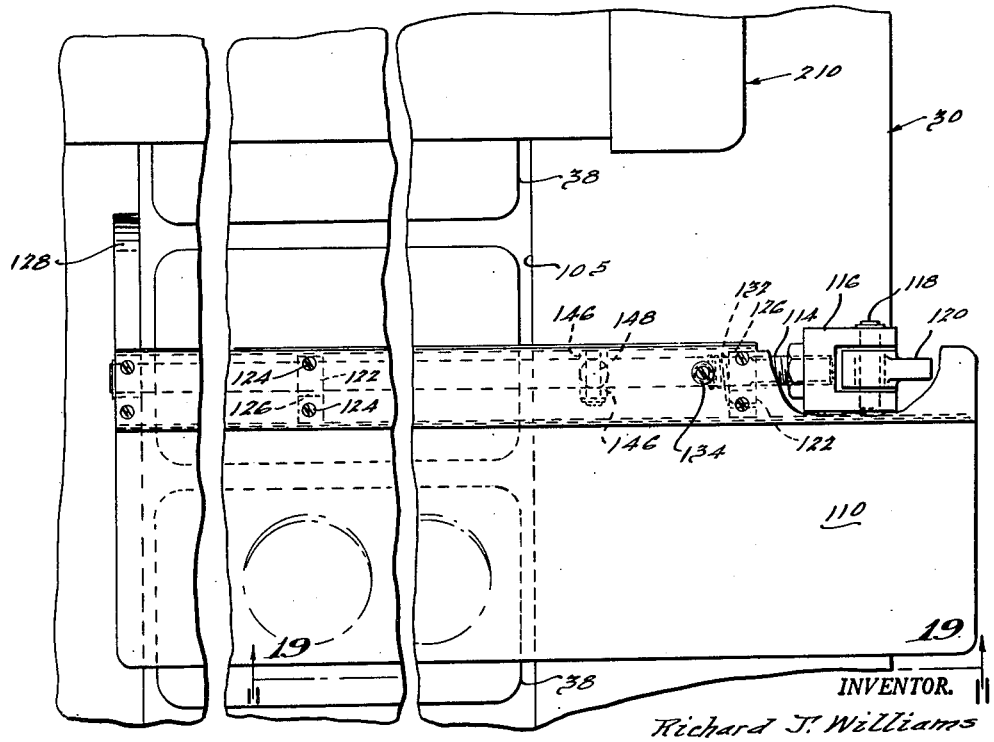

Figs. 10 and 11 are enlarged broken sectional views of the structure illustrated in Fig. 5, taken substantially along the lines 10—10 and 11—11 thereof, respectively;

Fig. 12 is an elevational view of the structure illustrated in Fig. 10, as viewed from line 12—12 thereof;

Fig. 13 is an enlarged broken sectional view of the structure illustrated in Fig. 5, taken substantially along the line 13—13 thereof;

Fig. 14 is a broken plan view of the structure illustrated in Fig. 13;

Fig. 15 is an elevational view of the structure illustrated in Fig. 13, as viewed from line 15—15 thereof;

Fig. 16 is a sectional view of the structure illustrated in Fig. 13, taken substantially along the line 16—16 thereof;

Fig. 17 is an enlarged sectional view of the structure illustrated in Fig. 5, taken substantially along the line 17—17 thereof;

Fig. 18 is an enlarged broken plan view of a portion of the structure illustrated in Fig. 2, as viewed from line 18—18 thereof;

Fig. 19 is a broken elevational view of the structure illustrated in Fig. 18, as viewed from line 19—19 thereof;

Fig. 20 is an elevational view of the structure illustrated in Fig. 19, as viewed from line 20—20 thereof;

Fig. 21 is an enlarged broken elevational view of a portion of the structure illustrated in Fig. 5; and Fig. 22 is a broken plan view of the structure illustrated in Fig. 5, as viewed from line 22—22 thereof.

It will be apparent that, in its broader aspects, the present invention may be embodied in bakery equipment of widely different types and sizes including machines for use with various types of doughs and batter. A preferred application of the invention is in the making of cookies, and in an illustrative but not in a limiting sense the invention is so disclosed herein.

Figure 1:
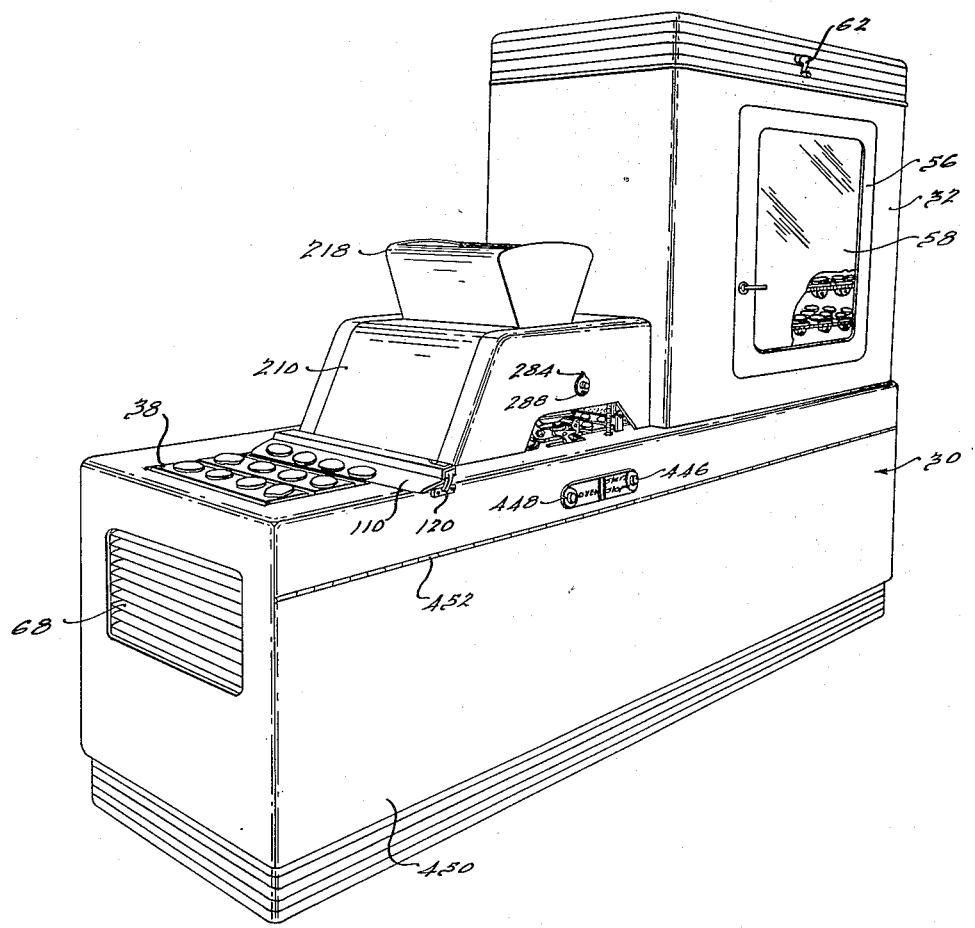
Figure 1 is a perspective view of a cookie baking machine constructed in accordance with the present invention.

In Figs. 1, 2 and 3, the cookie making machine there illustrated generally comprises a cabinet 30 having an insulated portion constituting a cooking or baking oven 32, and a ventilated portion 34 constituting a drying oven. An endless conveyor system, generally designated at 36, is mounted in the cabinet 30 for advancing a plurality of cookie trays 38 through the cooking oven 32, the drying oven 34, and past a plurality of processing stations disposed along a table portion 39 of the cabinet 30. These include a station 40 at which cookie batter is formed into cookie shape and dropped onto the trays 38; a station 42 at which any suitable topping such, for example, as sugar, nuts, chocolate or the like, may be dropped on the cookies; a cookie removing station 44 at which the finished cookies are removed from the machine after passing through the cooking oven 32 and the drying oven 34; a cleaning station 46 at which any cookie crumbs and excess topping are scraped from the trays; and a greasing station 48 at which the trays are greased in preparation for receiving another set of cookies to be baked. The continuous conveyor 36, and certain of the mechanism hereinafter described, employed at the various stations above mentioned, are driven by an electric motor 50 through an adjustable speed reducer 52 and a fixed speed reducer 54, all of which are also housed in the cabinet 30.

The cabinet 30 is generally rectangular in shape having the insulated cooking oven 32 disposed in an upwardly extending portion at one end thereof. Access to the cooking oven 32 is permitted by a door 56 which has a glass panel 58 therein permitting observation of the baking of the cookies. The circulation of heated air through the cooking oven 32 may be controlled by a damper 60 disposed centrally of the top of the cooking oven and operable by a handle 62 mounted on the front side of the cooking oven above the door 56. The cooking oven is preferably heated by electric heating units 64 mounted on the bottom of the oven. If desired, however, a conventional gas burner 66 may be employed in place of the electric heating element 64.

The motor 50 and speed reducer units 52 and 54 are mounted in the lower portion of the cabinet 30 directly below the cooking oven 32. The portion of the cabinet extending beyond the cooking oven 32 comprises the drying oven 34. Air is circulated through the drying oven through ventilators 68 and 70 at opposite ends of the cabinet 30 by a fan 72 which is mounted in the cabinet adjacent to the ventilator 70.

The endless conveyor system 36 comprises a pair of spaced endless chains 74 disposed adjacent to the front and rear of the cabinet 30 and trained over and supported on a plurality of sprocket wheels 76 rotatably mounted on suitable brackets 78 supported in the cabinet. The chains 74 are also trained over a pair of driving sprockets 80 mounted on a shaft 82 extending transversely of the cabinet. At its front end, the shaft 82 carries a sprocket 84 through which it is driven by a chain 86 trained over the sprocket 84 and a sprocket mounted on the output shaft of the gear box 54. The desired degree of tension is maintained in the chains 74 by training them bodily over movable sprockets 88 which are rotatably mounted on a transversely extending shaft 90 at the top of the oven 32. The ends of the shaft 90 are supported in corresponding ends of levers 92 which are pivotally supported intermediate their ends on the supporting structure 91 within the oven, the other end of which carry a plurality of weights 94. These weights may be changed to vary the tension in the chains 74 as desired. Since each of the sprockets 76 is freely rotatable upon its mounting, only a single pair of movable sprocket wheels 88 is required to prevent slack throughout the entire conveyor system. The length of conveyer line within the cooking oven 32 is properly proportioned relative to that within the drying oven 34 to provide the proper relation of baking time to drying time.

Referring to Figs. 7, 8, and 9, each of the trays 38 carried by the conveyer 36 is generally rectangular in form and has a downwardly extending peripheral flange 96. A pair of counterbalancing weights 98 is secured to the trays 38 at opposite ends thereof by Z-shaped brackets 100 having an upwardly extending leg riveted or otherwise secured to the flange 96 at the ends of the tray. An inwardly offset leg extends downwardly on each bracket, to which the weights 98 are secured by bolts 102 and cooperating nuts 104. Each tray 38 is supported across the chain 74 on a pair of aligned inwardly directed pins 106 each of which is secured to a chain 74, as by welding, in position to engage opposite ends of the tray. The brackets 100 and the flange 96 are notched at 107 to permit the trays 38 to be lowered vertically onto the pins 106 during assembly and to be readily lifted therefrom for purposes of cleaning or servicing the machine. From a consideration of this construction of the tray 38, it will be apparent that the tray is supported well above its center of gravity as lowered by the weights 98, and that, consequently, the upper surface thereof is horizontal at all times independently of the direction of movement of the segment of the chain upon which it is supported, as illustrated in Fig. 2.

The conveyer line 36 is so laid out that immediately upon entering the baking oven 32, the trays are carried to the top portion thereof remote from the heating element 64 from whence they travel back and forth across the oven, moving one step lower on each reversal of movement. The completely baked cookies are carried by the trays out through the bottom of the cooking oven and into the drying oven 34. When this drying process is completed, the trays carrying the finished cookies move upwardly along the left-hand end of the cabinet, as viewed in Fig. 2, and into an aperture 105 extending longitudinally of the table portion 39. The trays are carried along in the aperture 105 with their upper surface flush with the table portion 39 of the cabinet. To insure this disposition of the trays, the conveyer chains 74 are supported throughout this portion of their travel on a pair of spaced angle irons 108 secured to supporting members 109 which extend longitudinally of the cabinet adjacent to the front and rear edges of the aperture 105 in the table portion.

As the trays 38 move along the table portion 39 from left to right, as viewed in Fig. 2, they are moved through the above mentioned stations, 44, 46, 48, 40 and 42. The trays come first to the cookie removing station 44 where the cookies are removed by means illustrated in detail in Figs. 18, 19 and 20. The removing means comprises a cookie scoop 110 having a flat rectangular portion disposed transversely of the cabinet 30 and having one edge adapted to ride on the upper surface of the moving trays 38 to have the cookies advance thereon and removed from the trays as the trays advance thereunder. At the opposite edge of the scoop 110, a downwardly presenting channel 112 is integrally formed thereon. The cookie scoop 110 is carried by a shaft 114 having on its projecting end a bifurcated fitting 116 which is pivotally connected by a pin 118 to a bracket 120, thereby permitting pivotal movement of the scoop 110 in a vertical plane transversely of the cabinet 30. The above mentioned mounting of the cookie scoop 110 on the shaft 114 is accomplished by a plurality of blocks 122 disposed within the channel 112 transversely thereof and secured thereto by a plurality of screws 124. The blocks 122 are provided with oil impregnated or like bearings 126 in which the shaft 114 is journaled.

A leaf spring 128 is secured to the channel 112 by a pair of screws 130 in position to engage the table portion 39 rearwardly of the aperture 105, to urge the cookie scoop 110 to the position illustrated in Fig. 20, during the cookie picking-up portion of its cycle of operation. When the cookies have been picked up by the scoop, the latter is then pivoted about the pin 118 to the position illustrated in Fig. 19 by means hereinafter described, and the cookies slide down the scoop and off the machine into a suitable receptacle. A torsional coil spring 132 is disposed about the shaft with one end anchored thereto by a screw 134 and the other end anchored in one of the blocks 122. As the scoop is tilted upwardly, the release of the leaf spring 128 permits the spring 132 to rotate the cookie scoop about the shaft 114 to a position in which the flat rectangular portion of the cookie scoop and the adjacent side of the channel 112 form an angularly disposed trough along which the cookies slide from the machine, as above described.

The above described cookie scoop, as well as certain of the other mechanism disposed at other of the above mentioned stations, is controlled by as cam shaft 134 extending transversely of the cabinet 30 and carrying a sprocket wheel 136 driven from the speed reducer 54 by a chain 138, as illustrated in Fig. 2. The cam shaft is rotatably supported on a pair of vertically disposed, outwardly presenting channel elements 137, the lower ends of which are secured to the base of the cabinet and the upper ends of which are secured to the angle irons 109. A cookie remover cam 140 is mounted on the camshaft 134 and engages one end of a lever 142 which is pivotally mounted on the cabinet 30. The other end of the lever 142 is pivotally connected to the lower end of a rod 144, the upper end of which carries a bifurcated fitting 146 which is pivotally connected to the shaft 114 by a pin 148.

The speed of the camshaft 134 and the shape of the cookie remover cam 140 are such that the cookie scoop 110 moves in timed relation to the movement of the trays 38. The cycle of operation of the cookie scoop 110 is such that it engages the upper surface of one tray 38 until the cookies thereon have been picked up, and then pivots to the position illustrated in broken lines in Fig. 19 to discharge the finished cookies, and returns to the position illustrated in Figs. 2 and 20 after the gap between the adjacent trays has passed beneath the cookie scoop, but in time to pick up the cookies from the next tray.

From the cookie removing station 44 the trays 38 move to the cleaning station 46 at which a V-shaped doctor blade 150, mounted on the upper surface of the cabinet, scrapes the cookie crumbs and any excess topping from the upper surface of the trays. To insure that the doctor blade 150 will ride up onto the upper surface of the trays 38 and not become caught on the edges thereof, the corners of the trays are deformed to provide tapered or inclined portions 151. Because of the V-shape of the doctor blade 150, the scrapings removed by the doctor blade are moved toward the center of the cabinet and dropped between adjacent trays 38 onto a removable tray 160 extending transversely of the cabinet and supported on spaced transversely extending angle brackets 162.

The trays 38 thereafter are advanced to the greasing station 48 where they receive a coat of fresh grease preparatory to receiving a new set of cookies. A grease containing reservoir 164 extends transversely of the conveyer and is supported on the table portion 39 forwardly and rearwardly of the aperture 105. The grease is picked up from the reservoir 164 by a rotating cylinder 166, which is partially submerged in the grease, and is passed to a second cylinder 168 which is disposed parallel thereto and rolls in contact therewith and from which the grease is picked up by a rotating cylindrical brush 170 and applied to the trays 38. The rolls 166 and 168 are preferably of hollow, metal construction and carry meshing gears 172 and 174, respectively, which provide a positive drive therebetween. The cylindrical brush 170 is driven from the roll 168 through a belt 176 which is trained over pulleys 178 and 180 secured to the front ends of the roll 168 and the cylindrical brush 170, respectively. The roll 166 is driven from the camshaft 134 through a pair of interconnected, coaxial pulleys 181 and 182, rotatably supported on the cabinet rearwardly of the aperture 105 by a bracket 183. A V-belt 184 is trained over the larger pulley 182 and over a pulley 186 secured to the rearwardly extending end of the roll 166. A second V-belt 188 is trained over the smaller pulley 181 and over a pulley 190 secured to the rearwardly extending end of the camshaft 134 for rotation therewith.

The rolls 166 and 168 and the cylindrical brush 170 are supported on centrally disposed shafts 192, 194 and 196, respectively, which are journaled at each end in corresponding bearings 198, 200 and 202 carried on a pair of spaced, vertically disposed bearing plates 204. The bearing plates 204 are pivotally mounted on a transversely extending tubular shaft 206 which is disposed generally parallel to and in spaced relation above the table portion 39. The shaft 206 is supported at its ends on vertically disposed longitudinally extending side walls 208 of a hood, generally designated 210, which is mounted on the table portion and extends from the cooking oven 32 to a point beyond the doctor blade 150. The shaft 206 is supported on the side walls 208 by bolts 212 which are threaded into tapped bosses 214 which are welded or otherwise secured to the inner surface of the side walls 208 and which have inwardly extending shank portions 216 projecting into the open ends of the tubular shaft 206 to rotatably support the latter.

Referring to Figs. 4 and 5, the side walls 208 are held in the desired spaced relation by a pair of vertically spaced tubular spacer bars 217 extending transversely of the cabinet and disposed intermediate the topping dropping station 42 and the baking oven 32. The ends of the bars 217 are supported in suitable brackets 219 mounted on the side walls 208 by any suitable means such as screws 221.

From the greasing station the trays move to the station 40 at which the cookie batter is formed into cookie disks which are dropped onto the passing trays. The cookie batter is placed in and carried by a V-shaped hopper 218 which is disposed transversely of the cabinet and extends upwardly through the above mentioned hood 210. The hopper 218 comprises a pair of transversely extending side members 220 disposed at an angle to one another, and a pair of end plates 222 which are bolted to inwardly turned flanges 224 formed on the side members 220. At the bottom of the hopper, a pair of transversely extending rolls 226 is secured to shafts 228 which are journaled in suitable bearings 230 carried by the end plates 222. The rolls 226 function to force the cookie batter downwardly through the hereinafter described means for forming the cookies. To prevent the rolls from spinning in the batter without moving the latter, the external surfaces of the rolls are provided with a plurality of angularly spaced, longitudinally extending channels, best illustrated at 132 in Fig. 5. A space, indicated at 234 in Fig. 4, is provided between the adjacent surfaces of the rolls to permit the passage of the cookie batter downwardly therebetween. The rolls 226 are interconnected by a pair of meshing gears 236 mounted at corresponding ends of the shaft 228 and secured thereto. At its opposite end one of the shafts 228 carries a ratchet wheel 237 by which the rolls are driven. Adjacent to their lower edges, the sides 220 of the hopper 218 are shaped to conform to the curvature of the rolls 226 and terminate at their lower edges in downwardly turned flanges 235. The flanges 235, and the lower edges of the hopper end plates 222, seat on the upper surface of a pair of transversely extending supporting bars 238 which are secured to the sides 208 of the hood.

The above mentioned bars 238 are held in the proper spaced relation by end members 240 to which they are secured by bolts 242. One of the supporting bars 238, which is remote from the cooking oven 32, or to the left, as viewed in Fig. 5, has a pair of spaced brackets 242 spot-welded thereto adjacent to its ends, which extends outwardly and upwardly therefrom and support a transversely extending pivot rod 244. The end plates 222 of the hopper carry outwardly extending projections 246 in which the rod 244 is journaled. This construction permits the entire hopper 218, with the rolls 226 and the gears 236 and the ratchet wheel 237, to be pivoted about the rod 244 in a counterclockwise direction, as viewed in Fig. 5. To permit this pivoting of the hopper, the hood 210 is closed at the end remote from the cooking oven, by an end plate 247 which is supported on the sides 208 for pivotal movement about its lower edge.

The cross bars 238 also support an extruding die 246 extending longitudinally thereof and having a plurality of cookie extruding openings 247 spaced therealong. The die is provided with outwardly extending flanges 248 which engage in opposed complementary recesses formed in the cross arms 238 below the end plates 240. The die 246 is releasably secured in place by means of thumb screws 250 mounted in one of the cross bars 238 and engaging the flange 248 of the die. This construction permits the shape and size of the cookies to be varied by loosening the thumb screws 250 and substituting another die.

The rolls 226 are driven, and the extruded cookies are cut off and dropped onto the trays 18, by means operated from the camshaft 134 and including a pair of generally C-shaped arms 252 disposed at opposite ends of the hopper and interconnected intermediate their ends by a crossbar 254. The C-shaped arms 252 are rotatably mounted on coaxial pivots 256 mounted on the side members 208 of the hood. The upper end of each arm 252 is pivotally connected to the upper end of an actuating rod 258, the lower end of which is connected to a cam housing comprising a pair of flat spaced members 260 welded together at their ends and having aligned longitudinally extending slots 262 formed therein for receiving the camshaft 134 and permitting vertical movement of the housing relative thereto. This vertical movement of the housing occurs in response to the movement of a roller 264, supported between the spaced plates 260 on a pin 266 extending transversely thereof, as the roller 264 rolls along the peripheral surface of a cam 268 keyed to the camshaft 134 intermediate the plates 260. The cam 268 is shaped to gradually raise the housing and actuating shaft 258 from its lowered position to its fully raised position, illustrated in Fig. 5, and then rapidly drop the actuating shaft to the lowered position. This is accomplished by forming the cam 268 so that its roller engaging surface spirals outwardly from a point of minimum radius to a point of maximum radius and then abruptly returns to the minimum radius along a generally radially disposed portion of its surface. The cam causes the C-shaped arms 252 to rapidly move from the position illustrated in full lines in Fig. 5 to the position illustrated in broken lines, and then return relatively slowly to the position illustrated in full lines.

Considering first the function of the arm 252 as a part of the driving mechanism for the hopper rolls 226, and referring to Figs. 5 and 10, a quadrant plate 270 is rotatably mounted on a shaft 271 coaxial with the ratchet wheel 237 and supported in the side member 208. The quadrant plate 270 is disposed adjacent to and outwardly of the ratchet wheel 237 and carries a pawl 272 pivotally mounted thereon and resiliently urged into engagement with the ratchet wheel 237 by a spring 274. The plate 270 is connected to the arm 252 by a link 276 and at a point on the opposite side of the pivot pin 256 from the connection of the actuating rod 258 thereto. The arrangement of the arm 276 and the quadrant plate 270 is such that during the above described slow movement of the arm 252, the pawl 272 engages the ratchet wheel 237 and rotates the latter in a direction to cause the rolls 226 to rotate in the direction in which their adjacent surfaces move downwardly and force cookie batter through the extrusion die 246. The teeth on the ratchet wheel 237 and on the pawl 272 are formed to provide a positive engagement during this slow movement of the arm 252 while permitting the pawl to ride freely over the teeth of the gear as it moves in a reverse direction during the above described rapid movement of the arm 252. This construction permits the ratchet wheel to be disengaged from the pawl 272 and move with the hopper assembly during its above described tilting movement, and return to engagement with the pawl when the hopper assembly is returned to the operative position, illustrated in Fig. 5.

Intermediate the quadrant plate 270 and the ratchet wheel 237, an adjustable sector plate 280 is secured to the shaft 271 and may be positioned as desired by means of a control knob 282 secured to a portion of the shaft extending outwardly of the hood side member 208. The sector plate 280 has a peripheral portion concentric with the ratchet wheel 237 and of a radius slightly greater than the maximum radius of the gear. The sector plate 280 may be adjusted by means of the knob 282 to hold the pawl out of engagement with the gear during a desired portion of its movement and thereby vary the amount of rotation of the ratchet wheel 237 produced by the pawl 272 during one cycle of movement of the arm 252. It will be apparent that the portion of the driving stroke of the pawl 272 during which it is held out of engagement, as above described, may be varied by altering the position of the sector plate and consequently the position at which the pawl 272 moves clear of the sector plate and into engagement with the ratchet wheel 237.

To prevent accidental movement of the sector plate 280, a disk 284 is secured to the knob 282 externally of the hood side 208 and is clamped in any desired adjusted position by means of a bolt 286 extending through the side 208 and the disk 284 and receiving a knurled nut 288 on its outer end. The disk 284 is arcuately slotted, as indicated at 290, to permit limited shifting movement of the knob 282.

The cookie batter forced through the extruding die 246 is cut off and dropped onto the tray 38 by means of a cutter wire mechanism carried on the arm 252 adjacent to its lower end. Referring to Figs. 5, 13, 14, 15 and 16, the cutter wire means includes a movably mounted cutter bar extending between and supported on the lower ends of the arms 252. Outwardly of each arm 252, the bar 292 carries a crank 294 thereto for rotation therewith. A cutter wire 296, disposed parallel and in spaced relation to the bar 292, extends through corresponding ends of the crank 294 and is anchored at one end by a screw 298 which is threaded into one of the cranks 294 and clamps the just mentioned end between the crank and the head of the screw. To permit adjusting the tension in the cutter wire 296, its opposite end extends through a hollow bolt 300 and is reversely turned forming a loop 302, preventing withdrawal of the wire through the bolt 300. The bolt has a threaded engagement with the crank 294 and carries a locking nut 304 which may be tightened against the outer surface of the crank 294 when the bolt 300 has been adjusted to produce the desired tension in the wire. Intermediate the cranks 294, the wire 296 is supported by a plurality of adjustable arms 306 which are keyed to the shaft 292 by a single elongated key 308 and spaced to be disposed intermediate adjacent extruding openings in the die. Each arm 306 is secured against movement axially of the shaft 292 by a setscrew 310.

To provide a readily removable mounting of the cutter wire bar 292, an aperture, adapted to receive the cutter bar 292, is formed centrally of the lower end of each arm 252 and communicates with a downwardly extending slot 312, through which the shaft 292 may be lowered from the arm 252. The cutter bar 292 is held in assembled relation with the arm 252 by tubular retaining elements 314 slidably mounted on the shaft 292 and of a diameter substantially greater than the width of the slots 312. The locking elements 314 fit within cylindrical counterbores formed in the inner surfaces of the arms 252 and are resiliently held in position by springs 316.

One of the springs 316 also serves as a torsional spring having one end anchored to the shaft 292 by securing a reversely bent end 318 in an aperture extending transversely of the bar 292 and having its other end anchored to a flange 320 formed on one of the retaining elements 314. The just mentioned element 314 is held against rotation relative to the arm 252 by a pin 322 mounted in the arm and engaging within a notch 324 formed in the flange of the retaining element. This torsional spring acts to urge the cutter wire assembly in a clockwise direction, as viewed in Figs. 5 and 15, out of engagement with the die 246.

The other spring 316 may terminate in flat coils at each end, one end seating in a recess 326 formed in the associated retaining element and the other end seating against a washer 328 which is held against movement inwardly of the shaft 292 by a snap ring 330 mounted in a cooperating annular groove formed in the shaft.

Movement of the cutter wire assembly between the operative position illustrated in full lines in Figs. 5 and 15, and the retracted or inoperative position illustrated in broken lines in Fig. 5, is effected by a pair of similar cams 332 pivotally mounted on the outer surfaces of the arms 252 adjacent to the cranks 293. Referring to Figs. 5, 15 and 17, the cams 332 have a downwardly extending projection 334 adapted to engage stops 336 and 338, secured to the table portion 39 of the cabinet, at opposite limits of its movement during the cycle of movement of the arm 252. This engagement with the stops 336 and 338 pivots the cam between the position illustrated in full lines in Fig. 5 and the position there illustrated in broken lines. As the arm 252 reaches the limits of its relatively slow counterclockwise movement, as viewed in Fig. 5, the projection 334 engages the stop 336 and pivots the cam to the position illustrated in full lines, in which a finger 340, integrally formed on the cam, engages within a notch 342 formed on the crank 294, as best illustrated in Fig. 15. This provides a positive engagement holding the cutter wire assembly in the operative position and preventing the torsional spring 316 from pivoting the assembly to the retracted position during the cookie cutting operation. To prevent pivotal movement of the cam 332 beyond this position, as a result of the engagement of the projection 334 and the stop 336, an oppositely directed finger 344, integrally formed on the cam, engages an adjustable stop in the form of a shank 346 threaded in a laterally extending projection 348 integrally formed on the arm 252. The stop 346 is held in the desired adjusted position by a locking nut 350.

The cam 332 holds the cutter wire assembly in this position throughout the cookie cutting operation and until the arm 252 approaches the opposite limit of its movement and the cam projection 334 engages the stop 338 and pivots the cam to the position illustrated in broken lines in Fig. 5, and withdraws the cam finger 340 from engagement in the notch 342 of the crank.

The pivotal movement of the cam 332, upon engagement with the stop 338, is limited by the engagement of the finger 340 with a second adjustable stop 352 similar to the stop 346, and also threaded in the arm projection 348. Immediately upon the disengagement of the cam finger 340 from the crank 294, the torsional spring 316 rotates the cutter wire assembly to the retracted or inoperative position illustrated in broken lines in Fig. 5. This retracting of the cutter wire assembly prevents its interfering with the cookie batter being extruded during the counterclockwise movement of the arm 252.

Since the cutter wire 296 is carried by the C-shaped arm 252, it moves in an arc about the pivot pin 256 upon which the arm is pivotally mounted. The lower surface of the die 246, adjacent each of the plurality of cookie extruding openings 247 formed therein, lies in the surface of an imaginary cylinder concentric with the pivot pin 256. By virtue of this construction, the cutter wire 296 remains in contact with the lower surface of the cookie die 246 throughout the cookie cutting operation.

From the foregoing description, it will be apparent that during each cycle of movement of the C-shaped arm 252 one cookie is formed and cut from each of the plurality of extruding openings in the die 246 and dropped onto one of the trays 38. The speed of the cam shaft 134 and the speed of the sprockets 80 through which the conveyer is driven are so related that each passing tray receives a plurality of cookie disks at the cookie forming station 40.

After the cookie trays 38 receive the cookie disks in the above described manner, they move to the station 42 at which a suitable topping is dropped upon them by a mechanism which will now be described. The topping is carried in a generally rectangular shaped container 360 disposed transversely of the cabinet and comprising a pair of spaced walls 362 which are vertically disposed and terminate at their upper and lower ends in outwardly turned flanges 364 and 366, respectively. The container is closed at its sides by plates 368 which are provided with outwardly turned flanges 370 at their upper ends which engage cooperating flanges of brackets 372 which are spot-welded or otherwise suitably secured to the top of the hood 210. The container is releasably secured in place by thumb screws 373 mounted in the flanges 370 and having a threaded engagement with the brackets 372. At its bottom, the topping container 360 is closed by a semi-cylindrical shell 374 having outwardly turned flanges 376 for cooperating with the flanges 366 to removably secure the shell in place. The flanges 366 and 376 are secured together by a plurality of bolts 378 extending therethrough and receiving thumb nuts 380. The shell 374 is provided with a plurality of apertures 382 which are preferably arranged in a plurality of patterns adapted to drop topping upon the spaced cookie disks carried by the trays 38. The above described means of securing the cylindrical shell 374 permits the ready variation of the pattern of topping dropped upon the cookies by the simple expedient of replacing one shell with another having a different pattern.

The quantity of topping dropped and the period during which it is dropped are controlled by a metering plate 384 which is disposed within the container 360 and has a cylindrical surface adapted to fit and ride upon the inner surface of the cylindrical shell 374. The metering plate 384 is also provided with a plurality of apertures 386 adapted to be moved into and out of registry with the apertures 382 upon movement of the metering plate.

An agitator 388 is disposed within the lower end of the container 366 and having a plurality of U-shaped bars supported in spaced hubs secured to a shaft 390 extending transversely of the container and supported in the end plates 368. The shaft 390 is concentric with the semicylindrical bottom 374 of the topping container, and the metering plate 384 which rides on the inner surface thereof. The bars of the agitator 388 are proportioned so that the lower bars will move in an arcuate path adjacent to the inner surface of the metering plate 384 to insure a free flow of the topping material through the metering plate and the shell 374 when the apertures 386 and 382 are in registry.

The metering plate 384 is maintained in engagement with the shell 374 by a pair of spring pressed plungers 392 mounted in tubular arms 394 disposed at opposite ends of the container 360 and extending radially from the shaft 390. Each plunger 392 has a downwardly extending projection 393 at its outer end which is received in a cooperating aperture in the metering plate 384 to provide a driving engagement therewith. Each arm 394 is secured to a sleeve 396 adjacent to its inner ends by a setscrew 398. The sleeves 396 are rotatable relative to the shaft 390 and extend outwardly through the adjacent end plate 368. Externally of the container 360, and adjacent to its outer end, each of the sleeves 396 carries a crank 400 secured thereto for rotation therewith by a dowel pin 402. The lower end of the lever 400 is bifurcated, as best illustrated in Fig. 5, and engages a pin 402 fixed in the upper end of a crank 404, the lower end of which is secured to a transversely extending shaft 406 which is journaled in brackets 410 depending from the angle iron frame members 109. The shaft 408 extends forwardly of one of the cam housings 260 disposed adjacent to the front of the cabinet and carries a pawl plate 412 secured thereto upon which is mounted a pawl 414 which is normally urged in a counterclockwise direction, as viewed in Fig. 5, against a stop 416 by a spring 418.

The pawl 414 is adapted to engage a pair of overlapping cam projections 420 and 422 formed on the housing 260 and a movable plate 423, carried thereby, respectively, during the vertical reciprocable movement of the housing. The cam plate 423 is movably mounted to permit ready adjustment of the overlap of the projections 420 and 422 and hence of the effective cam surface which controls the length of time during which the topping is dropped upon the cookies and, consequently, the amount of the topping dropped.

During the operation of the cookie machine, the camshaft 134 continues to rotate in a counterclockwise direction, as viewed in Fig. 5, from the position there illustrated. The continued rotation of the arm 268 permits the roller 264, and the housing 260 in which it is mounted, to drop to their lower position. During this vertically downward movement of the housing, the lower edge of the projection 422 on the adjustable cam plate 423 engages the pawl 414 and pivots the shaft 408 to which it is connected through the pawl plate 412, causing the pawl 414, the pawl plate 412 and the levers 406 and 400 to move to the position illustrated in broken lines in Fig. 21. These elements remain in this position, thereby holding the metering plate 384 in its open position until the upper surface of the projection 420, on the housing, has moved clear of the pawl 414. The metering plate is then returned to its closed position illustrated in full lines in Figs. 5 and 21, by a torsional coil spring 424, one end of which projects through the shaft 408 and the other end of which is anchored in one of the brackets 410.

The movement of the agitator 388 is effected by oscillating the shaft 390, to which it is secured, by means of a crank 430, one end of which is secured to the shaft at its outer end. The other end of the crank 430 is bifurcated to extend on opposite sides of the actuating link 258. A driving engagement between the link 258 and the crank 430 is provided by a pair of washers 432 and 434 which are mounted on the rod 258 and between which the bifurcated end of the crank 430 is held. The lower washer 432 is supported in the desired position on a pair of nuts 436 threaded on the actuating rod. The upper washer 434 is resiliently urged downwardly against the upper surface of the crank's bifurcated end by a coil spring 438 which encircles the actuating rod and the upper end of which seats against a third washer 440 which is held against upward movement by a pair of nuts 442 also threaded on the shaft 258. From the foregoing, it will be apparent that the vertical movement of the actuating shaft 258 during the operation of the cookie machine will drive the crank 430 and through it oscillate the agitator carrying shaft 390 which is journaled in the sleeves 396.

From the topping dropping station 42 the conveyor carries the trays 38 into the cooking oven 32 through which they are moved in the above described manner. The above described cycle of movement is repeated for each tray and the machine will continue to form, bake and remove cookies so long as the cookie batter is replenished in the hopper 218 or until the operator shuts down the machine. The baking time for the cookies will vary for the different batters and sizes of the cookie disks and this is controlled by the time the cookies are in the oven which is regulated by the speed of the conveyer. Since all of the operating elements are synchronized ahead of the adjustable speed reducers 52, the speed of the conveyer can be changed without interfering with the synchronized operation of the elements. When the conveyer is to be run at maximum speed, the variation in baking time can be controlled by varying the output of the heating element or burner. The power supply to the motor and the heating element may be controlled by switches 446 and 448, respectively, mounted on the front wall of the cabinet and suitably connected to their respective units.

To permit access to the interior of the cabinet for adjusting the speed reducer 52 and servicing the equipment, the cabinet 30 is provided with a pivotally mounted front panel 450 which is connected to the front wall of the cabinet by a piano hinge 452 extending along its upper edge. The rear panel of the cabinet may be similarly mounted, or removably secured in the rear wall of the cabinet, by bolts or any other suitable means, to facilitate the servicing of the equipment.

What is claimed is:

1. In a machine for making baked goods, an endless conveyor having a tortuous path comprising substantially horizontal and upright runs and including a plurality of trays and means pivotally supporting said trays at spaced intervals along the conveyor for pivotal movement about a single axis, counterbalance weight means carried by said trays for normally maintaining said trays disposed horizontally, means for continuously driving said conveyor, an instrumentality at one point along the path of said conveyor engageable with said trays as said trays are moved therepast, said instrumentality being such as would normally cause said trays to swing about their pivots; and guide means at said point acting independently of the influence of said counterbalance weight means for positively holding a tray against swinging movement, while being moved by the conveyor and while the instrumentality at said point is engaged therewith.

2. In a machine for making baked goods, an endless conveyor having a tortuous path comprising substantially horizontal and upright runs and including a plurality of trays and means pivotally supporting said trays at spaced intervals along the conveyor for pivotal movement about a single axis, each of said trays having a normally horizontal surface disposed above the pivotal axis thereof; counterbalance weight means carried by said trays below the pivotal axis thereof for normally maintaining said trays disposed horizontally, means for continuously driving said conveyor, an instrumentality at one point along the path of said conveyor engageable with said trays as said trays are moved therepast, and guide means at said point acting independently of the influence of said counterbalance weight means for positively holding a tray against swinging movement, while being moved by the conveyor and while the instrumentality at said point is engaged therewith.

3. In a machine for making baked goods, an endless conveyor having a tortuous path comprising substantially horizontal and upright runs and including a plurality of trays and means pivotally supporting said trays at spaced intervals along the conveyor for pivotal movement about a single axis, each of said trays having a substantially flat undersurface, counterbalance weight means carried by said trays for normally maintaining said trays disposed horizontally, means for continuously driving said conveyor, an instrumentality at one point along the path of said conveyor engageable with said trays as said trays are moved therepast, and guide means at said point engageable with the undersurface of a tray and acting independently of the influence of said counterbalance weight means for positively holding a tray against swinging movement, while being moved by the conveyor and while the instrumentality at said point is engaged therewith.

4. In a machine for making baked goods, an endless conveyor having a tortuous path comprising substantially horizontal and upright runs and including a plurality of trays and means pivotally supporting said trays at spaced intervals along the conveyor for pivotal movement about a single axis, counterbalance weight means carried by said trays for normally maintaining said trays disposed horizontally, means for continuously driving said conveyor, means engageable with the trays at one point along the path of said conveyor for removing crumbs therefrom as said trays are moved therepast, and guide means at said point acting independently of the influence of said counterbalance weight means for positively holding a tray against swinging movement, while being moved by the conveyor and while engaged by said engageable means.

5. In a machine for making baked goods, an endless conveyor having a tortuous path comprising substantially horizontal and upright runs and including a plurality of trays and means pivotally supporting said trays at spaced intervals along the conveyor for pivotal movement about a single axis, counterbalance weight means carried by said trays for normally maintaining said trays disposed horizontally, means for continuously driving said conveyor, cookie removing means at one point along the path of said conveyor engageable with said trays as said trays are moved therepast, and guide means at said point acting independently of the influence of said counterbalance weight means for positively holding a tray against swinging movement, while being moved by the conveyor and while engaged by said cookie removing means.

RICHARD J. WILLIAMS.

REFERENCES CITED

The following references are of record in the file of this patent:

UNITED STATES PATENTS

| Number | Name | Date |
|---|---|---|
| 444,379 | Fowler et al. | Jan. 6, 1891 |
| 1,231,594 | Fullard | July 3, 1917 |
| 1,473,289 | Green | Nov. 6, 1923 |
| 1,488,252 | House | Mar. 25, 1924 |
| 1,529,107 | Backus | Mar. 10, 1925 |
| 1,832,374 | Forby et al. | Nov. 19, 1931 |
| 1,839,731 | Baum | Jan. 5, 1932 |
| 1,883,482 | Bausman et al. | Oct. 18, 1932 |
| 1,907,463 | Taroni et al. | May 9, 1933 |
| 1,967,933 | Hall | July 24, 1934 |
| 1,981,875 | McDonald | Nov. 27, 1934 |
| 2,173,000 | Holtzman et al. | Sept. 12, 1939 |
| 2,226,323 | Pointon | Dec. 24, 1940 |
| 2,414,235 | MacManus | Jan. 14, 1947 |
| 2,488,046 | Werner | Nov. 15, 1949 |

FOREIGN PATENTS

| Number | Country | Date |
|---|---|---|
| 24,769 | Sweden | May 23, 1908 |